No. 809,189. PATENTED JAN. 2, 1906.
M. W. KOUNS.
TRACTION ENGINE.
APPLICATION FILED AUG. 14, 1905.
5 SHEETS—SHEET 1.
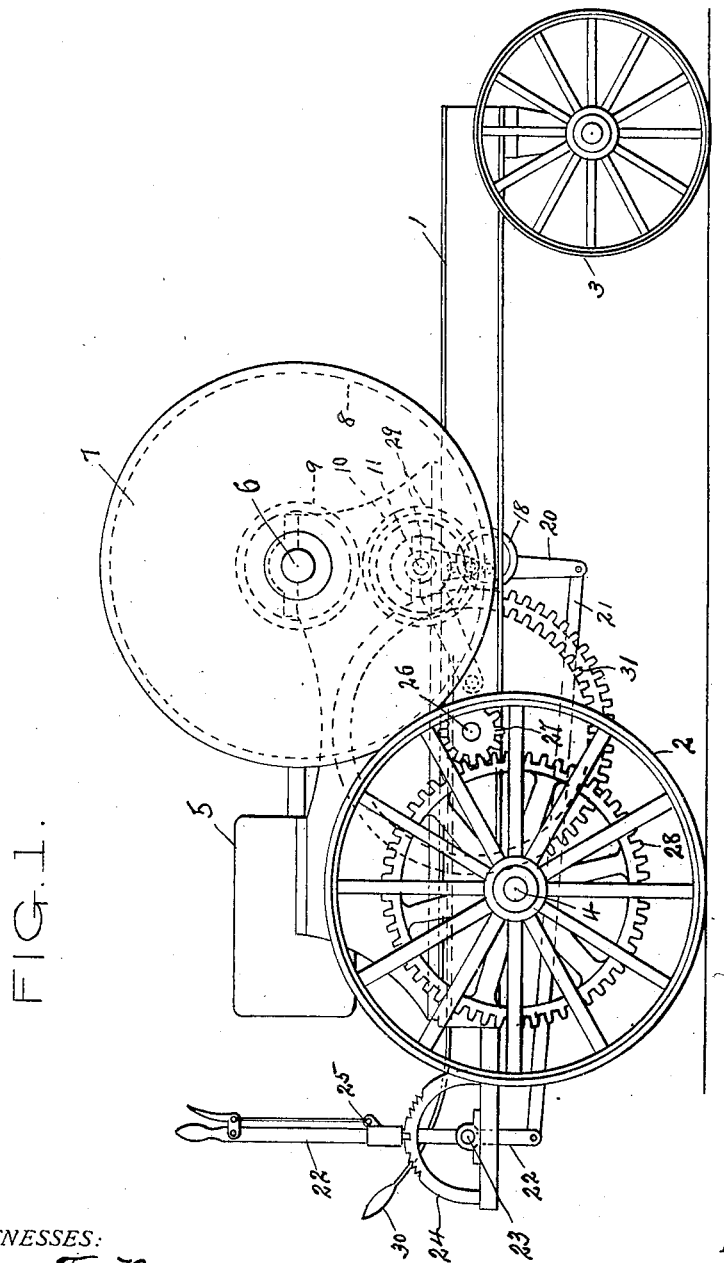
WITNESSES:
William F. Bauer
Irvine Miller
INVENTOR.
Moses W. Kouns.
BY H. H. Toulmin,
ATTORNEY.

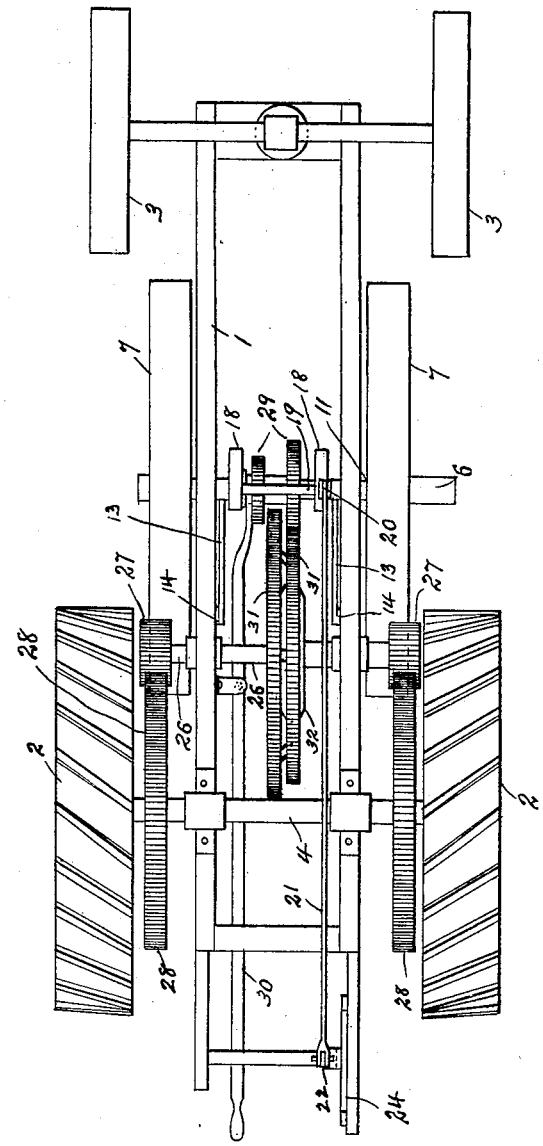

No. 809,189. PATENTED JAN. 2, 1906.
M. W. KOUNS.
TRACTION ENGINE.
APPLICATION FILED AUG. 14, 1905.
5 SHEETS—SHEET 3.
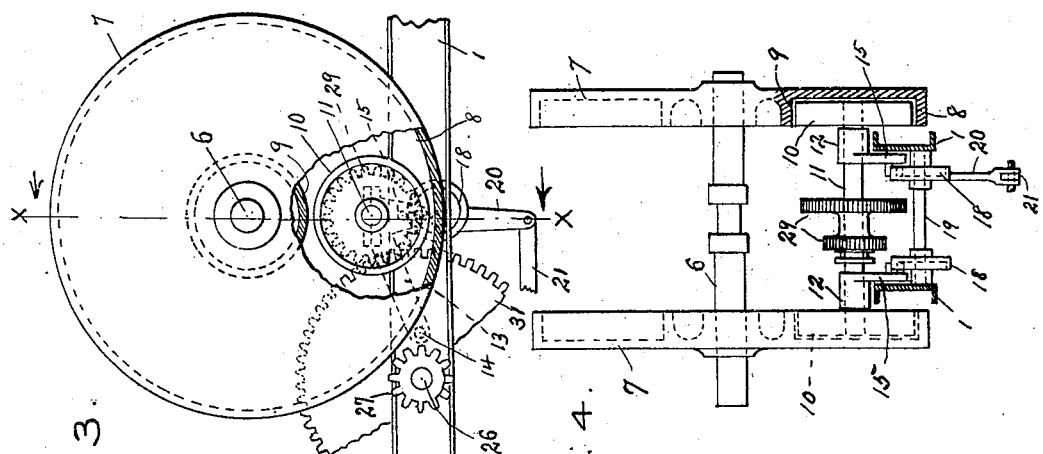
WITNESSES:
William F. Bauer
Ironie Miller
INVENTOR.
Moses W. Kouns.
BY
H. A. Toulmin,
ATTORNEY.

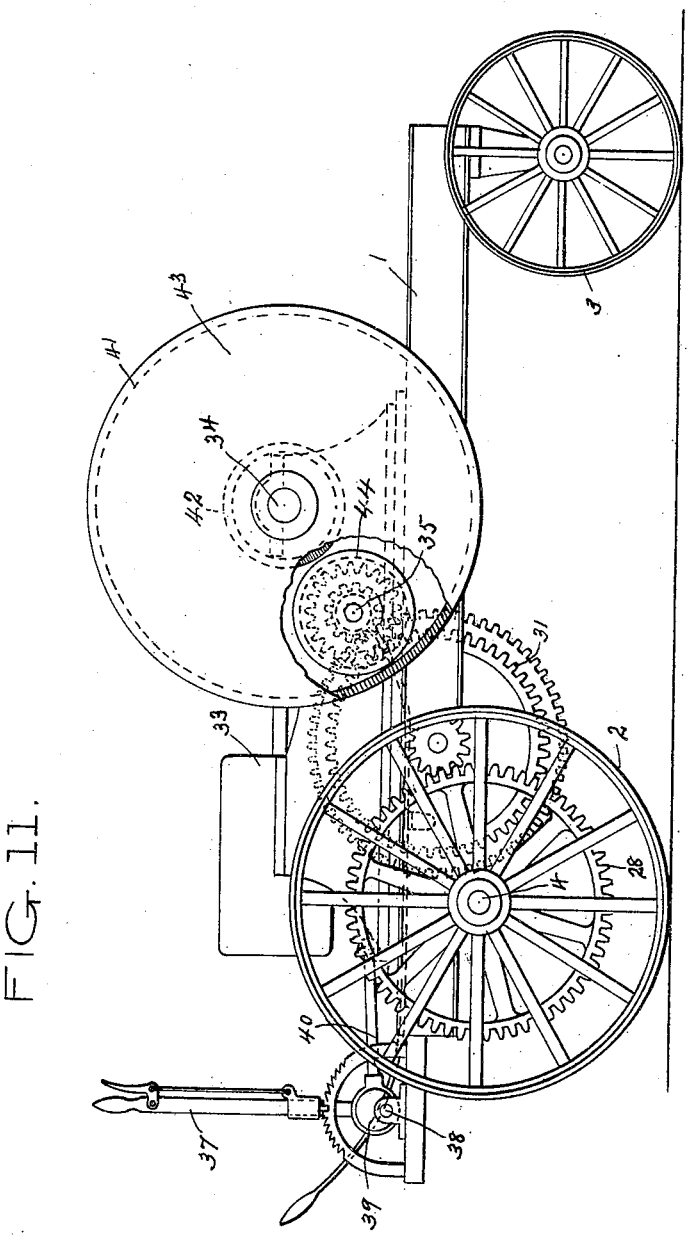

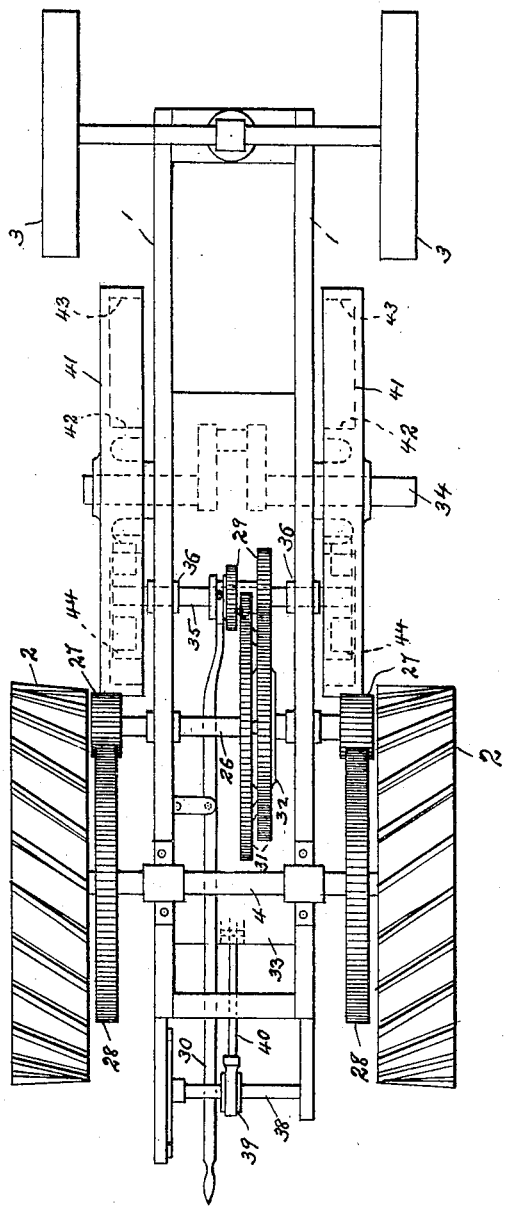

UNITED STATES PATENT OFFICE.

MOSES W. KOUNS, OF WASHINGTON COURT-HOUSE, OHIO, ASSIGNOR TO THE OHIO MANUFACTURING COMPANY, OF UPPER SANDUSKY, OHIO, A CORPORATION OF OHIO.

TRACTION-ENGINE.

No. 809,189.      Specification of Letters Patent.      Patented Jan. 2, 1906.

Application filed August 14, 1905. Serial No. 274,101.

*To all whom it may concern:*

Be it known that I, MOSES W. KOUNS, a citizen of the United States, residing at Washington Court-House, in the county of Fayette and State of Ohio, have invented certain new and useful Improvements in Traction-Engines, of which the following is a specification, reference being had therein to the accompanying drawings.

This invention relates to traction-engines, and has for its object to provide a simple and efficient construction of the driving mechanism whereby a gasolene-motor or other motor running always in the same direction and usually at the same rate of speed may be utilized for furnishing the propelling power.

To this end my invention consists in certain novel features, which I will now proceed to describe and will then particularly point out in the claims.

In the accompanying drawings, Figure 1 is a side elevation of a traction-engine embodying my invention in one form. Fig. 2 is an inverted plan view of the same. Fig. 3 is a detail side elevation, partly broken away. Fig. 4 is a detail front elevation, partly in section, on the line $x\ x$ of Fig. 3 and looking in the direction of the arrows. Fig. 5 is an enlarged vertical sectional view through the friction-gearing only, taken on a plane corresponding to the line $x\ x$ of Fig. 3 and looking in the opposite direction to the arrows. Fig. 6 is a detail elevation of one of the swinging arms which supports the counter-shaft detached. Fig. 7 is an end view of the same. Fig. 8 is a plan view of the same. Fig. 9 is a detail elevation of one of the eccentrics detached. Fig. 10 is a sectional view of the same, taken on the line $y\ y$ of Fig. 9 and looking in the direction of the arrows. Fig. 11 is a side elevation of a traction-engine embodying my invention in a modified form, and Fig. 12 is an inverted plan view of the same.

Referring first to the construction shown in Figs. 1 to 10 of the drawings, 1 indicates a suitable frame supported on driving ground-wheels 2 and steering ground-wheels 3, the driving ground-wheels being, as usual, supported so as to rotate independently on their axle 4. 5 indicates a motor mounted on the frame 1, the same being a gasolene-engine or similar explosive-motor rotating always in the same direction and usually at the same rate of speed. In the form of construction now under consideration this motor may be, and preferably is, fixedly secured to the frame 1. 6 indicates a shaft driven by the engine 5, the same being preferably the crank-shaft or engine-shaft. This shaft constitutes the driving-shaft, from which the motion of the driving ground-wheels is derived, and in the present instance I have shown the intermediate gearing as being arranged in duplicate, one set of gearing on each side of the machine, which is the arrangement I prefer, although it will be understood that one of these sets of gearing may be omitted. Each set of gearing comprises a friction-wheel 7, which is preferably, although not necessarily, a fly-wheel on the engine-shaft 6. This friction-wheel comprises an inwardly-directed annular friction-surface 8 and an outwardly-directed annular friction-surface 9, the two friction-surfaces being concentric and preferably in the form of annular flanges projecting inwardly from the body of the friction-wheel 7. Between these annular friction-surfaces there is located a friction-wheel 10 of a diameter somewhat less than the radial distance between the surfaces 8 and 9, as shown more particularly in Fig. 5. 11 indicates a counter-shaft on which the friction-wheels 10 are secured, said counter-shaft being mounted to rotate in bearings 12 on the free ends of arms 13, which are pivotally supported at their other ends, as indicated at 14, so that the free ends of said arms and said counter-shaft are free to move in a substantially vertical direction. Each arm 13 has at its free end a downwardly-extending portion 15, provided with pins or projections 16, and these pins embrace between them an annular flange 17 on an eccentric 18, said eccentrics being mounted in a rock-shaft 19, supported in suitable bearings on the frame 1. An arm 20 extends downward from the rock-shaft 19, being shown in the present instance as formed with one of the eccentrics 18, and has pivotally connected to its lower end a connecting rod or link 21, which latter extends rearward and is pivoted at its rear end to the lower end of a hand-lever 22, pivoted on the main frame at 23 and having the usual locking-quadrant 24 and coöperating locking mechanism 25. It will be seen that in the position of the parts shown the friction-wheel 10 lies between and out of contact with both of the friction-surfaces 8 and 9, and it will be further seen that movement of the lever 22 in one direction will draw the friction-wheel 10 downward into contact with the annular friction-surface 8, which may be termed the "internal" friction surface or gear of the friction-wheel 7, while movement of the lever 22 in the opposite direction will bring the friction-wheel 10 into contact with the annular friction-surface 9, which may be termed the "external" friction surface or gear of the friction-wheel 7. Thus the counter-shaft 11 may be caused to rotate at will in one direction or the other. Said counter-shaft 11 is connected by suitable gearing with an intermediate shaft 26, mounted in suitable bearings in the frame 1 and provided at its ends with pinions 27, which mesh with gears 28 on the driving ground-wheels 2. This intermediate gearing may be of any suitable construction; but I prefer to so construct it as to provide a compensation between the driving ground-wheels in turning curves and also to provide means for changing the speed and power with which the ground-wheels are driven. To this end there is mounted to slide on the counter-shaft 11 a double pinion 29, driven by said counter-shaft and shifted by means of a hand-lever 30 or other suitable device. The shaft 26 has thereon a double gear 31, and the parts are so constructed in a well-known manner that the small pinion member may be caused to mesh with the larger gear member to drive the intermediate shaft 26 by a relatively low speed, but with increased power, or the larger pinion member may be caused to mesh with the smaller gear member, as shown, so as to cause the shaft 26 to be driven with a relatively high speed. The double gear 31 is provided with a well-known form of compensating gearing 32, between it and the two parts of which the shaft 26 is composed, so that the two driving-wheels are permitted to turn at different rates of speed in going around curves in a manner well known in the art.

It will be observed in the first place that the driving-gearing described is compact and simple and readily operated by a single lever. In addition to these advantages it will be understood that the forward drive of the engine is obtained by bringing the counter-shaft friction-wheel into contact with the internal friction-ring of the friction-wheel on the main or engine shaft. This gives an increased area of frictional contact, so that less pressure is required to insure the the transmission of power, and the strains on the bearings arising from this pressure are correspondingly reduced. Furthermore, the counter-shaft will be driven at a relatively high speed when in position for forward motion. It is well known that the forward drive is used to a much greater extent in engines of this class than the rearward drive, the latter being only of occasional use, so that the bearings have the least strain upon them when the parts are in the position in which they are generally used. The rearward motion or the reverse drives the counter-shaft at a relatively low speed, and this is advantageous for the reason that it is generally desirable that the machine should move slowly when backing. A still further advantage of the construction illustrated is that the vibrations of the engine are reduced to a minimum, the connection of the friction-gearing with the fly-wheel of the engine absorbing the shocks of heavy explosions and acting to equalize the strains and vibrations. In practice I have found that even poorly-balanced gasolene-engines are caused to run smoothly when employed in connection with the construction just referred to. It will also be noticed that the counter-shaft moves in an arc of a circle substantially concentric with the intermediate shaft 26, so that the pinions on the counter-shaft do not materially increase their distance from the gears on the intermediate shaft, with which they mesh. I have shown the supporting-arms 13 as pivoted immediately adjacent to the intermediate shaft 26, the distance being so small as to cause no material separation of the gears, and it is obvious that the arms 13 might be hung directly upon the shaft 26 or concentric therewith, if desired.

I have already stated that I prefer to combine in a single element the friction-wheels and fly-wheels of the main or driving shaft 6; but it is obvious that the separation of these elements—as, for instance, where it is desirable to apply friction-wheels to an engine-shaft already provided with fly-wheels—is within the scope of my invention. Furthermore, although I have shown a construction in which the main or driving shaft 6 rotates in fixed bearings, the counter-shaft being movable relatively thereto, my invention is not limited to this particular construction, but may be embodied in a structure in which the counter-shaft rotates in fixed bearings, the main or engine shaft being movable toward and from the same. In Figs. 11 and 12 I have shown such a construction, in which the engine (designated in this case by the reference-numeral 33) is arranged to slide longitudinally upon the main frame, its shaft 34 moving in unison with it, while the counter-shaft (indicated by the reference-numeral 35) is mounted in fixed bearings 36 on the main frame. The engine is shifted by means of a hand-lever 37, having the usual locking means and operating a rock-shaft 38, on which is secured an eccentric 39, which by means of a connecting-rod 40 serves to move the engine backward and forward on the main frame. By reason of this construction either the internal friction-surface 41 or the external friction-surface 42 of the friction-wheels 43 may be brought into contact with the friction-wheels 44 on the counter-shaft 35.

Other modifications will readily suggest themselves, and I therefore do not wish to be understood as limiting myself strictly to the precise details of construction hereinbefore described, and shown in the accompanying drawings.

Having thus fully described my invention, what I claim as new, and desire to secure by Letters Patent, is—

1. In a traction-engine, the combination, with a frame and driving ground-wheels supporting the same, of an engine of the character described mounted on said frame, a shaft driven by said engine and having a friction-wheel with concentric internal and external annular friction-surfaces, a counter-shaft provided with a friction-wheel located between said friction-surfaces and connected with the driving ground-wheels by suitable gearing, and means for relatively moving said shafts to bring the counter-shaft friction-wheel into contact with either the internal or external friction-surface of the other friction-wheel, substantially as described.

2. In a traction-engine, the combination, with a frame and driving ground-wheels supporting the same, of an engine of the character described mounted on said frame, a shaft driven by said engine and having a friction-wheel with concentric internal and external annular friction-surfaces, a counter-shaft provided with a friction-wheel located between said surfaces and connected with the driving ground-wheels by suitable gearing, and means for moving said counter-shaft toward and from the other shaft to bring the counter-shaft friction-wheel into contact with either the internal or external friction-surface of the other friction-wheel, substantially as described.

3. In a traction-engine, the combination, with a frame and driving ground-wheels supporting the same, of an engine of the character described mounted on said frame, a shaft driven by said engine and having a friction-wheel with concentric internal and external annular friction-surfaces, a counter-shaft provided with a friction-wheel located between said friction-surfaces and connected with the driving ground-wheels by suitable gearing, pivoted arms supporting said counter-shaft, and means for actuating said arms to move the counter-shaft toward and from the other shaft and bring the counter-shaft friction-wheel into contact with either the internal or external friction-surface of the other friction-wheel, substantially as described.

4. In a traction-engine, the combination, with a frame and driving ground-wheels supporting the same, of an engine of the character described mounted on said frame, a shaft driven by said engine and having a friction-wheel with concentric internal and external annular friction-surfaces, a counter-shaft provided with a friction-wheel located between said friction-surfaces and connected with the driving ground-wheels by suitable gearing, pivoted arms supporting said counter-shaft, and means for actuating said arms to move the counter-shaft toward and from the other shaft and bring the counter-shaft friction-wheel into contact with either the internal or external friction-surface of the other friction-wheel, said means comprising an eccentric engaging one of the arms, a hand-lever, and operative connections between said hand-lever and eccentric, substantially as described.

5. In a traction-engine, the combination, with a frame and driving ground-wheels supporting the same, of an engine of the character described mounted on said frame, a shaft driven by said engine and having a friction-wheel with concentric internal and external annular friction-surfaces, an intermediate shaft operatively connected with the ground-wheels and provided with a gear, a counter-shaft having a pinion to mesh with said gear and a friction-wheel located between the friction-surfaces of the other friction-wheel, arms supporting said counter-shaft at their free ends and pivotally supported at their other ends to move in an arc substantially concentric with the intermediate shaft, and means for actuating said arms to bring the counter-shaft friction-wheel into contact with either the internal or external friction-surface of the other friction-wheel, substantially as described.

6. In a traction-engine, the combination, with a frame and driving ground-wheels supporting the same, of an engine of the character described mounted on said frame and having a crank-shaft provided with a fly-wheel having concentric internal and external annular friction-surfaces, a counter-shaft provided with a friction-wheel located between said friction-surfaces and connected with the driving ground-wheels by suitable gearing, and means for relatively moving said shafts to bring the counter-shaft friction-wheel into contact with either the internal or external friction-surface of said fly-wheel, substantially as described.

7. In a traction-engine, the combination, with a frame and driving ground-wheels supporting the same, of an engine of the character described mounted on said frame, a shaft driven by said engine and having two friction-wheels, each provided with concentric internal and external annular friction-surfaces on its inner face, a counter-shaft extending between said friction-wheels and having at each end a friction-wheel located between the friction-surfaces of the corresponding friction-wheel on the driven shaft, said counter-shaft being connected with the driving ground-wheels by suitable gearing, and means for relatively moving said shafts to bring the counter-shaft friction-wheels into contact with either the internal or external friction-surfaces of the other friction-wheels, substantially as described.

8. In a traction-engine, the combination, with a frame and driving ground-wheels supporting the same, of an engine of the character described mounted on said frame, a shaft driven by the engine and having two friction-wheels with concentric internal and external annular friction-surfaces on their adjacent faces, an intermediate shaft having a driving connection with the ground-wheels and provided with a gear, a counter-shaft extending between the friction-wheels of the driven shaft and provided at its ends with friction-wheels located between the friction-surfaces thereof, said counter-shaft having a pinion to mesh with the gear of the intermediate shaft, arms supporting said counter-shaft at their free ends and pivotally supported at their other ends to move in an arc substantially concentric with the intermediate shaft, a rock-shaft provided with eccentrics engaging said arms to actuate the same, a hand-lever, and operative connections between said hand-lever and rock-shaft, substantially as described.

9. In a traction-engine of the character described, a driving friction-wheel having concentric internal and external annular friction-surfaces, a counter-shaft having a friction-wheel located between said friction-surfaces, pivoted arms supporting said counter-shaft, one of said arms having adjacent projections, a rock-shaft having an eccentric thereon provided with an annular flange engaging between the adjacent projections of the arm, and means for operating said rock-shaft, substantially as described.

10. In a traction-engine of the character described, a driven shaft having two friction-wheels thereon provided with concentric internal and external annular friction-surfaces, a counter-shaft provided with friction-wheels located between said surfaces, arms supporting said counter-shaft at their free ends and pivoted at their other ends, said arms having adjacent projections, a rock-shaft having eccentrics thereon provided with annular flanges engaging between the projections of the arms, and means for operating said rock-shaft, substantially as described.

In testimony whereof I affix my signature in presence of two witnesses.

MOSES W. KOUNS.

Witnesses:
W. R. HARE,
T. J. SAWYER.